United States Patent
Clem et al.

(10) Patent No.: US 7,203,203 B2
(45) Date of Patent: Apr. 10, 2007

(54) MESSAGE RING IN A SWITCHING NETWORK

(75) Inventors: Shaun Clem, Thousand Oaks, CA (US); Jimmy Pu, Agoura Hills, CA (US); Darrin Patek, Thousand Oaks, CA (US); Todd Khacherian, Moorpark, CA (US); Chris Reed, Oxnard, CA (US)

(73) Assignee: Internet Machines Corp., Agoura Hills, CA (US)

( * ) Notice: Subject to any disclaimer, the term of this patent is extended or adjusted under 35 U.S.C. 154(b) by 956 days.

(21) Appl. No.: 10/006,072

(22) Filed: Dec. 5, 2001

(65) Prior Publication Data

US 2003/0103501 A1 Jun. 5, 2003

(51) Int. Cl.
*H04L 12/28* (2006.01)

(52) U.S. Cl. ............... 370/424; 370/389; 370/235; 370/470

(58) Field of Classification Search ........ 370/229–238, 370/412–422, 360–430; 709/223–251
See application file for complete search history.

(56) References Cited

U.S. PATENT DOCUMENTS

| | | | |
|---|---|---|---|
| 4,704,606 A | 11/1987 | Hasley | |
| 4,754,451 A | 6/1988 | Eng | |
| 5,404,461 A | 4/1995 | Olnowich | |
| 5,550,823 A | 8/1996 | Irie | |
| 5,555,543 A | 9/1996 | Grohoski | |
| 5,606,370 A | 2/1997 | Moon | |
| 5,784,003 A | 7/1998 | Dahlgren | |
| 5,841,874 A | 11/1998 | Kempke | |
| 5,856,977 A | 1/1999 | Yang | |
| 5,859,975 A * | 1/1999 | Brewer et al. | 709/213 |
| 5,898,689 A | 4/1999 | Kumar | |
| 5,909,440 A | 6/1999 | Ferguson | |
| 6,067,408 A | 5/2000 | Runaldue | |
| 6,172,927 B1 | 1/2001 | Taylor | |
| 6,389,489 B1 | 5/2002 | Stone | |
| 6,442,674 B1 | 8/2002 | Lee | |
| 6,487,171 B1 | 11/2002 | Honig | |

(Continued)

OTHER PUBLICATIONS

Definition of "token-ring network" from web-site Webopedia Definition and Links, pp. 1-2, printed Aug. 14, 2001, http://www.webopedia.com/TERM/token_ring_network.html.

(Continued)

*Primary Examiner*—Seema S. Rao
*Assistant Examiner*—Michael J. Moore
(74) *Attorney, Agent, or Firm*—SoCal IP Law Group LLP; Steven C. Sereboff

(57) ABSTRACT

There is disclosed a switching network for efficiently receiving and transmitting data packets having both frames and messages. The switching network includes a crossbar switch with a plurality of surrounding ports for exclusively switching frames which normally consist of large data streams of 40 to 60 bytes. Then the ports are connected together in a message ring and small data entity messages, for example 4, 8, or 12 bytes, are switched from an input port to an output port around the ring avoiding congestion of the crossbar switch.

20 Claims, 5 Drawing Sheets

U.S. PATENT DOCUMENTS

| | | | |
|---|---|---|---|
| 6,493,347 B2 | 12/2002 | Sindhu | |
| 6,510,138 B1 | 1/2003 | Pannell | |
| 6,570,876 B1 | 5/2003 | Aimoto | |
| 6,574,194 B1 | 6/2003 | Sun | |
| 6,587,470 B1 * | 7/2003 | Elliot et al. | 370/404 |
| 6,611,527 B1 | 8/2003 | Moriwaki | |
| 6,621,818 B1 * | 9/2003 | Szczepanek et al. | 370/389 |
| 6,658,016 B1 * | 12/2003 | Dai et al. | 370/424 |
| 6,728,206 B1 * | 4/2004 | Carlson | 370/222 |
| 6,735,219 B1 | 5/2004 | Clauberg | |
| 6,754,741 B2 | 6/2004 | Alexander | |
| 6,836,479 B1 | 12/2004 | Sakamoto | |
| 2001/0037435 A1 | 11/2001 | Van Doren | |
| 2002/0061022 A1 | 5/2002 | Allen, Jr. | |
| 2002/0099855 A1 | 7/2002 | Bass | |
| 2004/0230735 A1 | 11/2004 | Moll | |

OTHER PUBLICATIONS

Token Ring/IEEE 802.5, pp. 1-5, printed Aug. 14, 2001, http://www.cisco.com/univercd/cc/td/doc/cisintwk/ito_doc/tokenrng.htm.

Petaswitch Solutions, Inc., The Pisces Chipset, Product Brief, 2001, http://www.peta-switch.com/products/product_brief.htm.

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., Company Overview, 2001, http://www.peta-switch.com/ markets/overview.htm.

Stiliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

Gupta, Scheduling in Input Queued Switches: A Survey, Jun. 1996, Department of Computer Science, Stanford University, California.

Schoenen, et al., Distributed Cell Scheduling Algorithms for Virtual-Output-Queued Switches, Dec. 1999, pp. 1211-1215, vol. 1, GLOBECOM, IEEE Global Telecommunications Conference.

Fahmy, A Survey of ATM Switching Techniques, Aug. 14, 2001, Department of Computer and Information Science, The Ohio State Univerisity.

* cited by examiner

MESSAGE RING IN A SWITCHING NETWORK

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

This patent is related to application Ser. No. 09/971,097 entitled "Switching Apparatus For High Speed Channels Using Multiple Parallel Lower Speed Channels While Maintaining Data Rates" and filed Oct. 3, 2001.

BACKGROUND OF THE INVENTION

1. Field of the Invention

The present application is directed to a switching network for receiving and transmitting data packets having both frames and messages which utilizes a ring for messages and an associated crossbar switch for frames.

2. Description of the Related Art

In a switching network, all receiving channels (or ports) route data to a switching fabric. The switching fabric sends the data to a specific destination port. The data is normally in the form of data packets either of uniform or variable length. A data packet may include both frames which consist of relatively long strings of data bytes for example 40 to 64 bytes and larger, and messages which consist of small entities of, for example 4, 8, or 12 bytes. Such small entity messages might include formats of broadcast flow control, back pressure/feed forward messages, linked table configuration, write or read formats and other similar formats. Input ports are connected to output ports by a well known crossbar connection matrix. Such crossbar matrices typically reside on a die where there may be 64 ports and each port has a data bus of 16 signal lines. Thus, with a total of 2,048 signal lines, the crossbar switches are silicon resource intensive. In other words, to efficiently utilize this silicon resource (that is the silicon die on which the crossbar switch is integrated), it is very inefficient to transmit small entity messages (that is 4, 8, or 12 bytes, for example, as discussed above) through the crossbar switch. It is more efficient, rather, to transmit frame size packet portions which range from 40 to 64 bytes and greater.

Ring networks have also been suggested for data transfer. See IEEE 802.5 standard. However, this is used in a computer network where a computer must first catch a token and then attach a "message" to it.

DETAILED DESCRIPTION OF THE INVENTION

Figure 1:
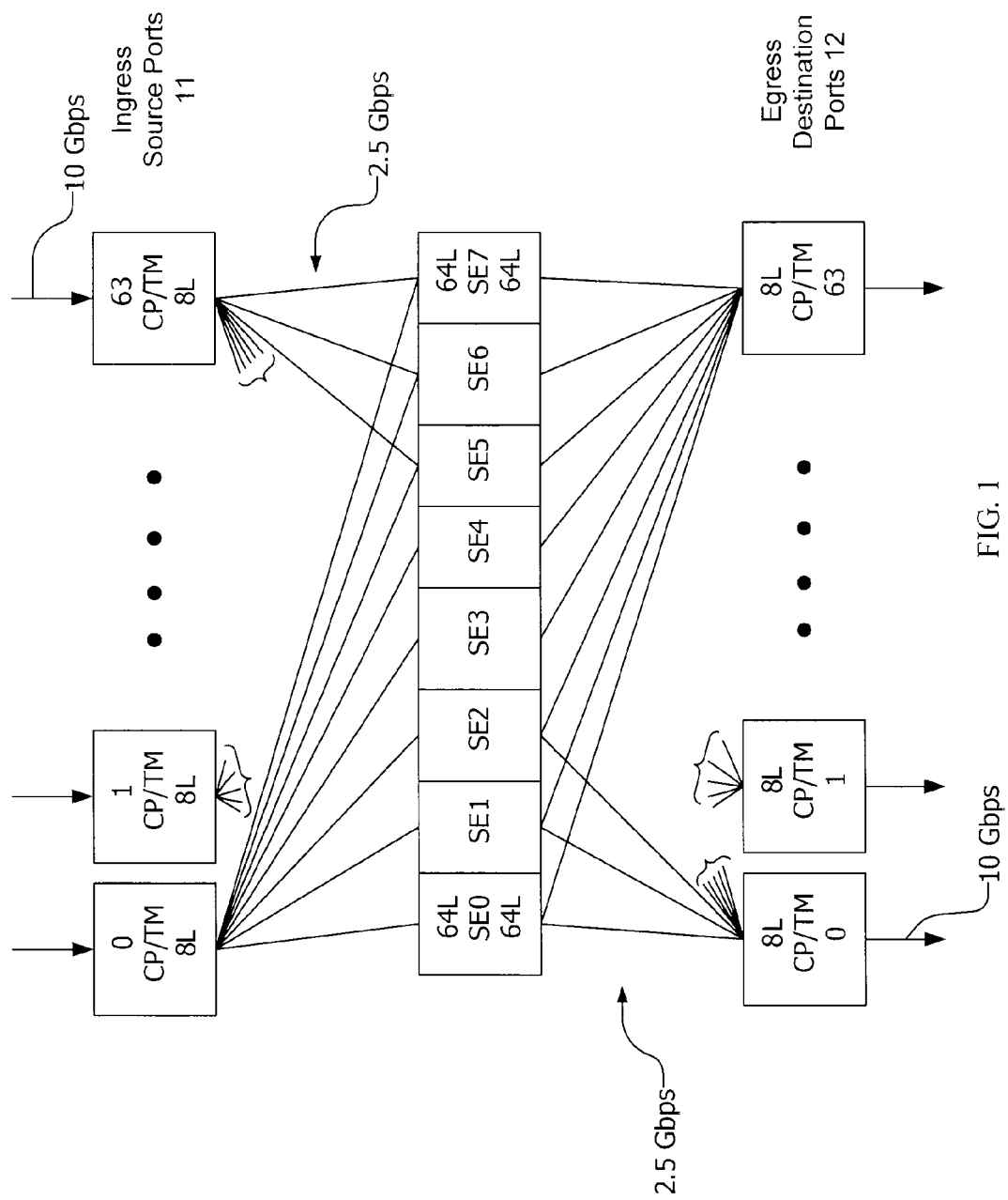
FIG. 1 is a is a simplified block diagram of switching apparatus embodying the present invention.

FIG. 1 is an overall diagram of a switching apparatus which includes as an essential component the switching network of the present invention. Specifically, there are 8 switch elements designated SE0 through SE7. Each of these switch elements have 64 input and 64 output lines. There are equivalent numbers of switching networks in each of the switching elements. The overall switching apparatus in FIG. 1 is also disclosed in co-pending application Ser. No. 09/971,097.

Referring in general to the operation of the switching apparatus of FIG. 1, there are a number of ingress source ports 11 numbered 0 through 63, each receiving data packets from, for example, a framer which normally puts together such packet, at a rate of 10 Gbps. The ingress ports 11 include a TM (traffic manager) and a communications processor (CP) and are labeled CP/TM. Each ingress source port has an 8-line output port, each individually coupled to an input port of switch elements SE0 through SE7 which together create a so-called switching fabric. In turn, the eight switch elements each with 64 input ports and 64 output ports are similarly connected on an output side to egress ports 12 also designated CP/TM which have 8-line inputs and are numbered 0 through 63. The combination of the 64 ingress ports and 64 egress ports make up a 64 port full duplex port.

Again, as on the input side, each output port of a switch element has a direct serial link to one of the CP/TMs or egress port units. Then the egress ports 12 are coupled into, for example, a high speed channel network (e.g., fiber optic) to transmit data at a 10 Gbps rate in a manner similar to the incoming data, but with the data having been rerouted to a selected destination port. Finally, as indicated in FIG. 1, the high input and output data rates of 10 Gbps cannot normally be sustained separately by the switch elements SE0 through SE7 which as indicated are limited to a lower data rate of 2.5 Gbps.

Figure 2:
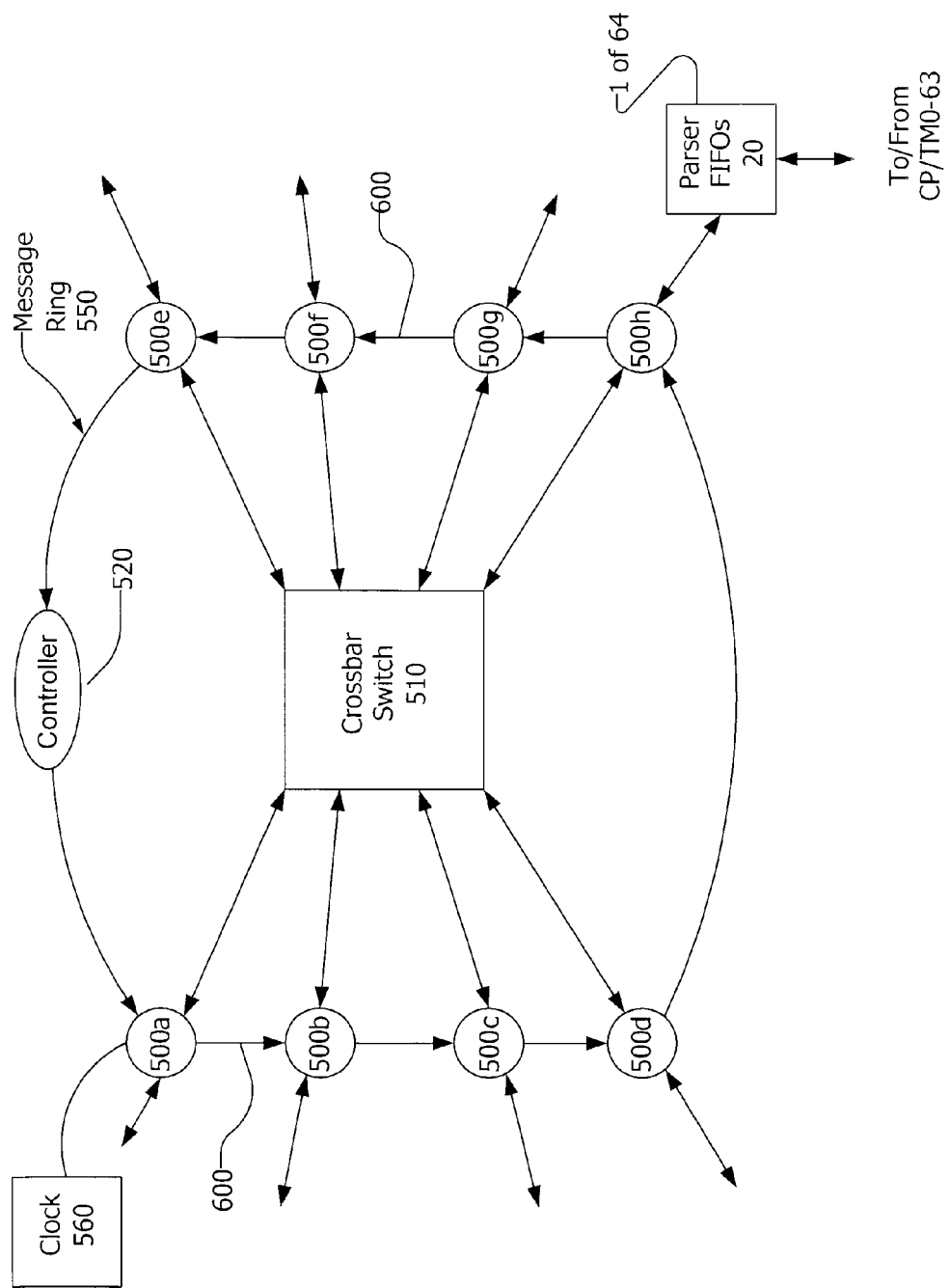
FIG. 2 is a circuit schematic of message ring architecture embodying the present invention.

FIG. 2 illustrates a combined crossbar switch 510 with a message ring 550 having a number of input ports nominally designated 500*a* through 500*h*. From a practical standpoint, in the context of the present invention, there is one input port (and one output port) for each of the 64 lines shown in, for example, switching element SE0 in FIG. 1. Thus, the circuit of FIG. 2 is an integrated portion of each of the switching elements SE0 and SE7 of FIG. 1. Each port may either be a source, that is input, or destination port depending on the nature and the location of the switching element. The switching network of FIG. 2 forms a typical crossbar switch (as discussed above) where the internal crossbar switch unit 510 receives from the various input ports 500*a* through 500*h*, data streams from the various communications processors/traffic managers 0 through 63 illustrated in FIG. 1.

Figure 3:
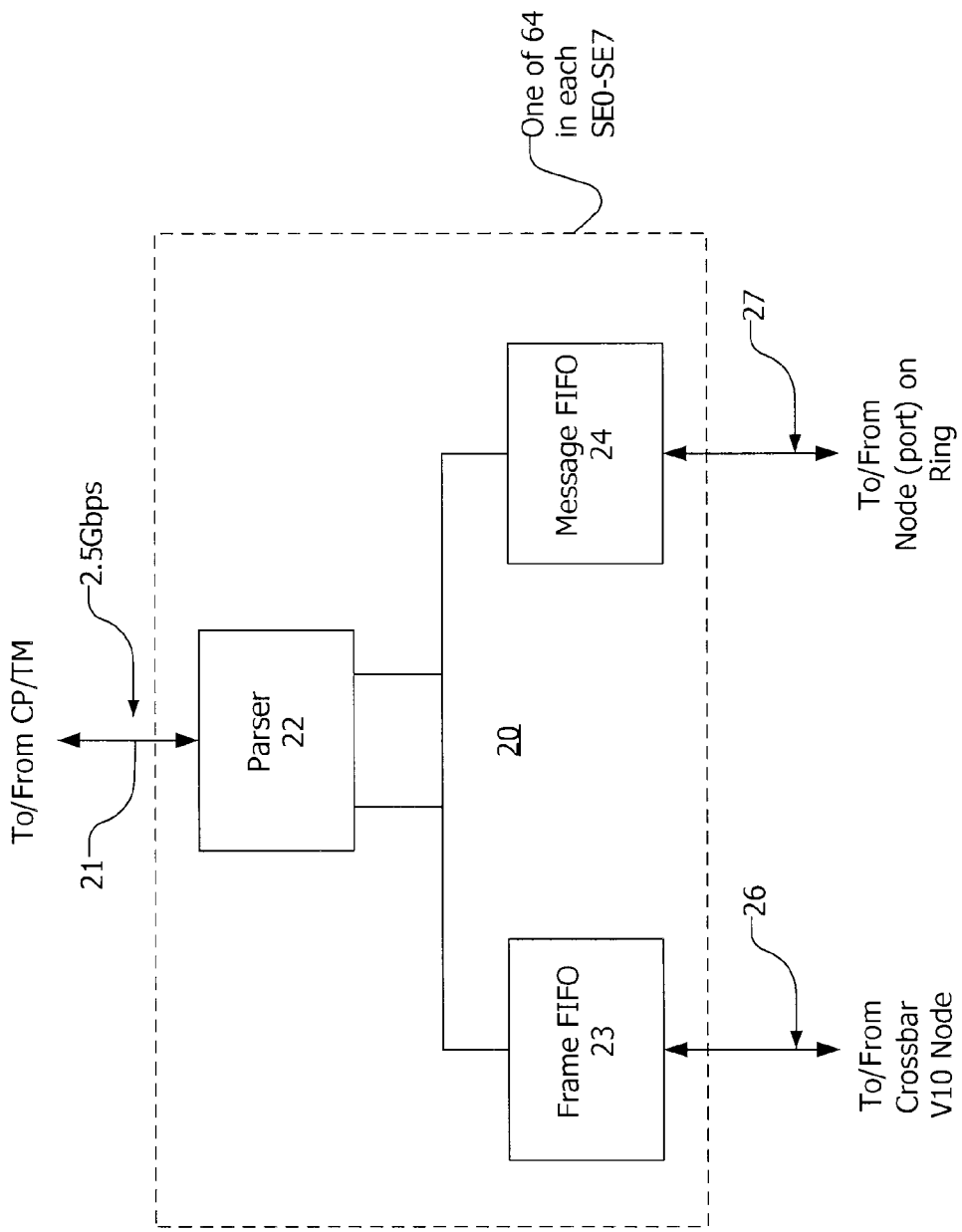
FIG. 3 is a block diagram illustrating the operation of FIG. 2.

Referring briefly to FIG. 3, each port of the switching network of FIG. 2, is associated with a parser/FIFO illustrated in dash outline 20 in FIG. 2 and shown in greater detail in FIG. 3. On line 21, data packets are routed to or from a CP/TM at a 2.5 Gbps rate. A parser 22 identifies whether the portion of the data packet is a message or frame and then respectively sends it to a frame FIFO 23 or a message FIFO 24 (FIFO being an abbreviation for First In First Out memory). Then, on the input/output lines 26, 27 of the respective FIFOs, the frame or message data is input to a port or node 500a–500h (one of the 64 ports) and processed or switched as determined by the ring controller 520 and the clock 560.

If a frame is being routed to a desired destination port, the crossbar switch 510 operates in a normal manner where, for example, data would be input into the node 500h, directly switched to the crossbar switch 510, and then immediately switched to the desired destination port. As discussed above, to perform this switching with a small entity message would be both inefficient and unduly congest the crossbar switch. Thus, if a message that is in place or queued up in message FIFO 24 as illustrated in FIG. 3, it is inserted in a particular node or port (assuming the port has no other data present in it at the moment) and then passed successively through intermediate ports via the interconnecting lines 600 between ports until the final destination port is reached. Thus, the interconnecting lines 600 between the ports 500a–500h form the message ring 550. Under the control of clock 560, messages are moved from one available port to the next for every clock pulse.

Figure 4:
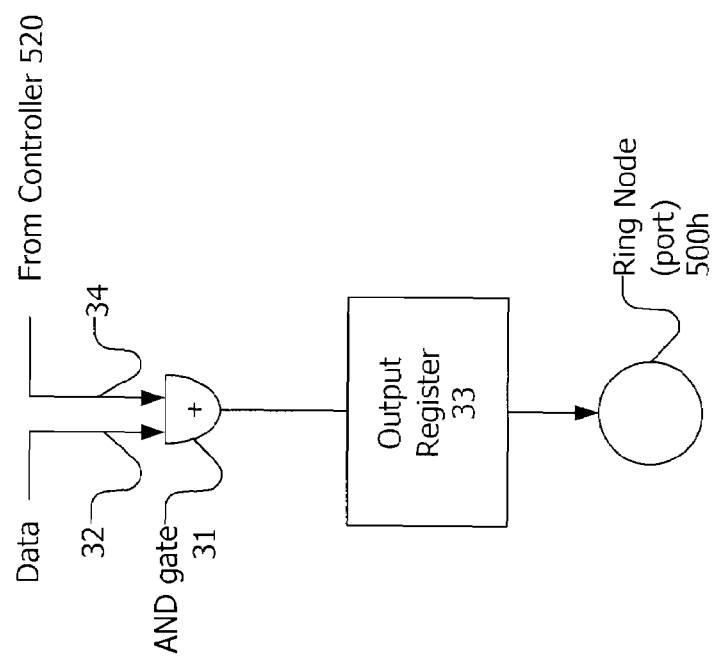
FIG. 4 is a circuit schematic illustrating the operation of FIG. 2.

In order to avoid conflict with the crossbar switch, however, each port 500a–500h includes, as illustrated in FIG. 4, a gate 31 (nominally of the AND type) which buffers a data input 32 to an output register 33 which is connected to, for example, a port 500h under the control of line 34 from the controller 520. This prevents conflict with the simultaneous crossbar switching of the same switching network as illustrated in FIG. 2.

Figure 5:
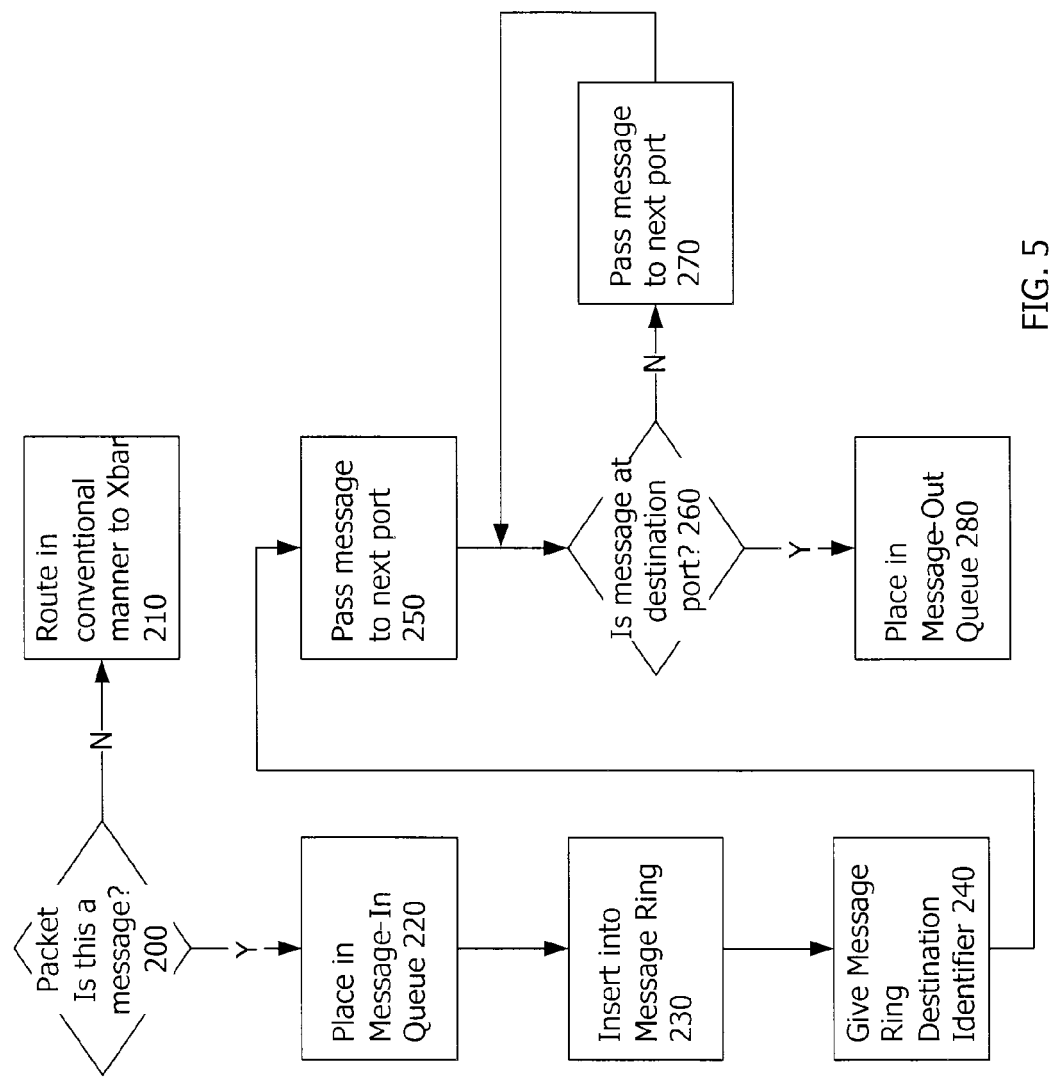
FIG. 5 is a flow chart illustrating the operation of FIG. 2.

FIG. 5 is a flow chart illustrating the operation of FIGS. 3, 4 and 5. In step 200 a data packet is analyzed by the parser 22 and it is determined whether it is a message or frame.

Then in step 210, if it is a frame, it is routed in the conventional manner through the crossbar switch as discussed above. If a message is placed in a message-in queue in step 220 (as also illustrated in FIG. 3) it is handled in a first in, first out (FIFO) manner.

In step 230 the message is inserted into one of the ports or nodes of the message ring, that is 500a–500h, and is also given a message ring destination identifier in step 240. It is passed from port to port in step 250 under the control of the clock 560 and the gate unit of FIG. 4.

In step 260 the question is asked if the message is at its destination port. If no, it is passed to the next port in step 270 but if yes as indicated in FIG. 5, it is placed in a message out queue in step 280. And as illustrated in FIG. 3, the message out queue is a message FIFO which is operating in an output manner.

Thus, messages do not pass through the crossbar 510 as illustrated in FIG. 3 but instead they are passed directly through the message ring from port to port. Thus, congestion of the crossbar switch is minimized.

In summary, a switching network for receiving and transmitting data packets having both frames and messages is provided by the use of a message ring.

CLOSING COMMENTS

The foregoing is merely illustrative and not limiting, having been presented by way of example only. Although exemplary embodiments of the invention have been shown and described, it will be apparent to those having ordinary skill in the art that changes, modifications, and/or alterations may be made, none of which depart from the spirit of the present invention. All such changes, modifications and alterations should therefore be seen as within the scope of the present invention.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

What is claimed is:

1. A switching apparatus for receiving and transmitting frames and messages, wherein the frames consist of relatively long strings of bytes and the messages consist of small entities, the switching apparatus comprising
   a ring of plural data ports comprising input ports and output ports, wherein each data port is interconnected to two adjacent data ports, the ring defining for any given pairing of one input port and one output port a set of zero or more intermediate data ports in a given direction, the ring for passing the messages received at the input ports through any respective intermediate ports to designated output ports
   a crossbar for switching the frames from the input ports to the output ports
   wherein the frames and messages are processed simultaneously
   wherein the messages do not pass through the crossbar.

2. The switching apparatus of claim 1 further comprising a parser for separating the frames from the messages to form two separate data streams.

3. The switching apparatus of claim 1 further comprising a clock for moving the messages by one data port for every clock pulse.

4. The switching apparatus of claim 1 further comprising plural gates respectively associated with each data port for allowing a given message into a given data port only if no other data is present in the given data port.

5. The switching apparatus of claim 1 further comprising a controller for preventing conflict between message passing on the ring and switching by the crossbar.

6. A process for receiving and transmitting frames and messages, wherein the frames consist of relatively long strings of bytes and the messages consist of small entities, the process comprising
  interconnecting plural data ports in a ring, the data ports comprising input ports and output ports, wherein each data port is interconnected to two adjacent ports, the ring defining for any given pairing of one input port and one output port a set of zero or more intermediate data ports in a given direction
  passing the messages received at the input ports around the ring through any respective intermediate ports to designated output ports
  simultaneously with the passing the messages, switching the frames from the input ports to the output ports via a crossbar, wherein the messages do not pass through the crossbar.

7. The process of claim 6 further comprising
  separating the frames from the messages to form two separate data streams.

8. The process of claim 6 further comprising
  moving the messages by one data port for every clock pulse.

9. The process of claim 6 further comprising
  allowing a given message into a given data port only if no other data is present in the given data port.

10. The process of claim 6 further comprising
  preventing conflict between message passing on the ring and switching.

11. Apparatus for receiving and transmitting frames and messages, wherein the frames consist of relatively long strings of bytes and the messages consist of small entities, the apparatus comprising
  means for interconnecting plural data ports in a ring, the data ports comprising input ports and output ports, wherein each data port is interconnected to two adjacent ports, the ring defining for any given pairing of one input port and one output port a set of zero or more intermediate data ports in a given direction
  means for passing the messages received at the input ports around the ring through any respective intermediate ports to designated output ports
  means for switching the frames from the input ports to the output ports via a crossbar, wherein the messages do not pass through the crossbar and wherein the means for switching the frames is configured to operate simultaneously with the means for passing the messages.

12. The apparatus of claim 11 further comprising
  means for separating the frames from the messages to form two separate data streams.

13. The apparatus of claim 11 further comprising
  means for moving the messages by one data port for every clock pulse.

14. The apparatus of claim 11 further comprising
  means for allowing a given message into a given data port only if no other data is present in the given data port.

15. The apparatus of claim 11 further comprising
  means for preventing conflict between message passing on the ring and switching.

16. A process for receiving and transmitting frames and messages, wherein the frames consist of relatively long strings of bytes and the messages consist of small entities, the process comprising
  analyzing a data packet
  if the data packet is a frame, then routing the frame through a crossbar switch
  if the data packet is a message, then
    inserting the message into one of a plurality of ports, wherein the ports are interconnected in a ring
    giving the message a message ring destination identifier
    passing the message from port to port until the message reaches a destination port, wherein the message does not pass through the crossbar switch.

17. The process of claim 16 further comprising
  if the data packet is a message, then placing the message in a message-in queue.

18. The process of claim 17
  wherein the message-in queue comprises a FIFO.

19. The process of claim 16 further comprising
  after the message reaches the destination port, placing the message in a message-out queue.

20. The process of claim 19
  wherein the message-out queue comprises a FIFO.

* * * * *